T. H. BUTLER & F. M. WIDERMAN.
CORN HUSKER.
APPLICATION FILED APR. 22, 1908.
915,934.
Patented Mar. 23, 1909.
2 SHEETS—SHEET 2.
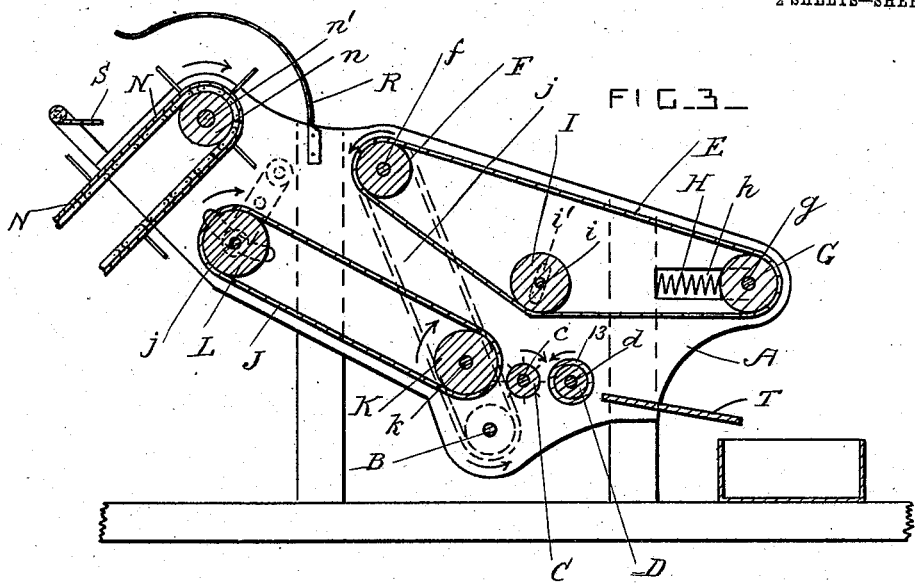
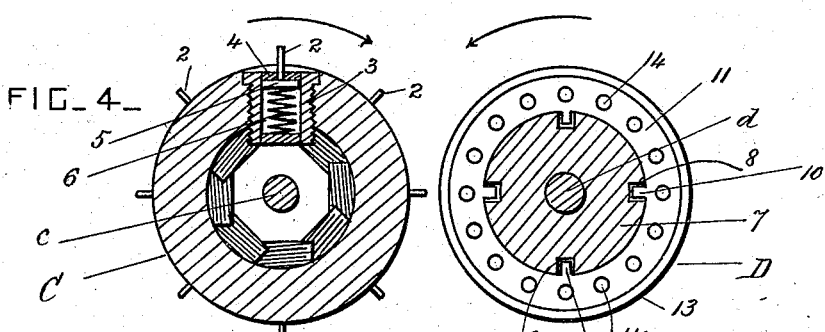
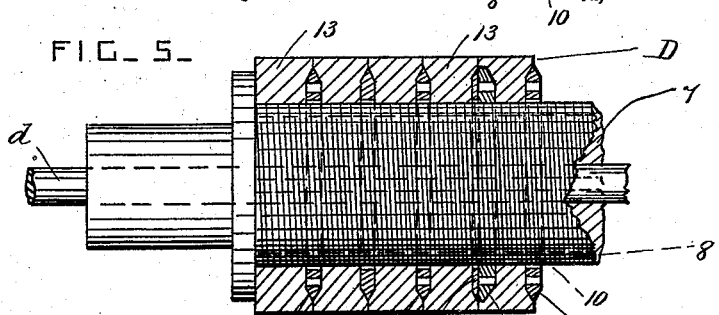
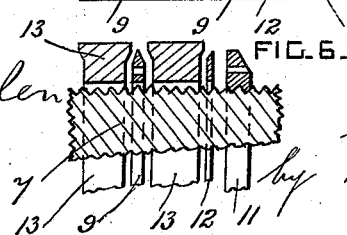
WITNESSES:
Walter Allen
L. B. Middleton
INVENTORS
Thomas H. Butler, and
Francis M. Widerman
by Herbert W. D. Jenner.
Attorney

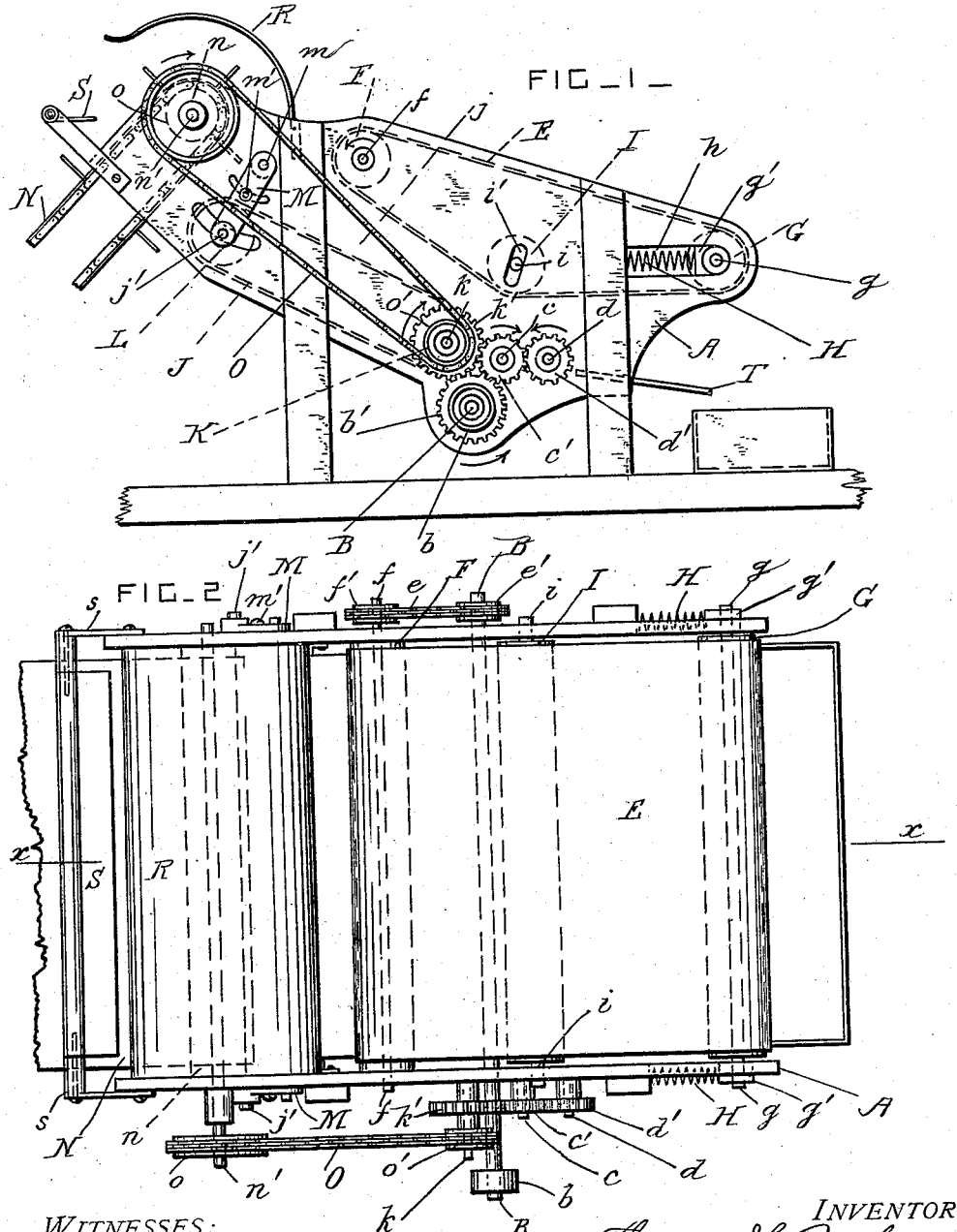

UNITED STATES PATENT OFFICE.

THOMAS H. BUTLER, OF BALTIMORE, MARYLAND, AND FRANCIS M. WIDERMAN, OF NEW YORK, N. Y.

CORN-HUSKER.

No. 915,934.

Specification of Letters Patent.

Patented March 23, 1909.

Application filed April 22, 1908. Serial No. 428,543.

*To all whom it may concern:*

Be it known that we, THOMAS H. BUTLER, residing at Baltimore city, Maryland, and FRANCIS M. WIDERMAN, residing at New York city, in the State of New York, have invented certain new and useful Improvements in Corn-Huskers; and we do hereby declare the following to be a full, clear, and exact description of the invention, such as will enable others skilled in the art to which it appertains to make and use the same.

This invention relates to machines for husking corn; and it consists in the novel construction and combination of the parts hereinafter fully described and claimed.

In the drawings, Figure 1 is a side view of the machine. Fig. 2 is a plan view of the same. Fig. 3 is a longitudinal section through the machine, taken on the line $x$—$x$ in Fig. 2. Fig. 4 is a cross-section through the husking-rolls, drawn to a larger scale. Fig. 5 is a longitudinal section through a portion of the smooth husking-roll. Fig. 6 is a detail longitudinal section through portions of the cylinder, disks, nuts and washers used in forming the smooth husking-roll, showing the parts before being screwed up.

A is the frame of the machine, and B is the driving-shaft journaled in the lower part of the frame and provided with any approved form of driving-wheel $b$.

C and D are the two husking-rolls. The roll C is secured on a shaft $c$, and the roll D is secured on the shaft $d$, and these shafts are mounted to revolve in the frame A in any approved manner. A toothed wheel $c'$ is secured on the shaft $c$ and gears into a toothed wheel $d'$ secured on the shaft $d$ so that the rolls revolve in opposite directions. The two rolls are driven by a toothed wheel $b'$ secured on the shaft B and gearing into the wheel $c'$.

The roll C is preferably provided with a series of spikes 2 arranged in spiral form. Sockets 3 are let into holes or pockets in the roll, and the spikes project through holes in guide-plates 4 secured at the tops of the sockets. The spikes have heads 5 inside the sockets, and 6 are spiral springs arranged between the said heads and the bottoms of the sockets. Instead of having spikes, the roll C may have any other approved form of projections for giving it an uneven surface which will remove the husks from the corn.

The roll D is provided with a surface of soft or pliable material. The body portion 7 of the roll is screwthreaded, and is provided with longitudinal grooves 8. Washers 9 having tapering edges are slid loosely upon the part 7 and are provided with projections or splines 10 which engage with the grooves 8 so that the washers do not revolve on the part 7. Nut washers 11 are screwed at intervals upon the body part 7 of the roll, and have thin facing washers 12 upon one side of them. Disks 13 of soft material, such as an india rubber composition, are arranged between the washers so as to form an unbroken cylindrical surface at the periphery of the roll. The nut-washers 11 together with the screwthreaded portion of the roll constitute means for compressing the disks 13 between the washers 9, and they also operate as fastening-devices for clamping the said disks and washers on the body portion of the roll. The washers have holes 14 or other equivalent means for engaging with the sides of the disks 13, so that the said disks are gripped tightly when the nut washers are screwed up. When holes 14 are provided the soft material of the disks 13 is squeezed slightly into the end portions of the holes by the end pressure of the nut-washers when screwed up. The disks 13 are of larger diameter than the said washers, and their peripheral portions are pressed over the edges of the washers so that the roll has a continuous yielding surface. The sides of the disks are recessed to receive the washers as much as desirable according to the thickness of the washers used. Any part of the periphery of the roller can be renewed when it becomes worn by contact with the projections of the rolls C or with the ears of corn.

E is an endless apron of flexible material carried by rollers F and G. The roller F is secured on a shaft $f$ which is journaled in the frame A at the front end of the machine. A sprocket-wheel $f'$ is secured on the shaft $f$, and $e$ is a drive-chain which passes over the sprocket-wheel $f'$ and over a sprocket-wheel $e'$ secured on the driving-shaft B. The roller G is arranged at the rear end of the machine, and is secured on a shaft $g$ which is journaled in slidable bearings $g'$. The bearings $g'$ slide horizontally in guide-slots $h$ formed in the frame A, and H are springs which press the bearings $g'$ rearwardly and hold the apron E under a prearranged tension.

I is the pressing-roll which bears on the middle part of the lower bight of the apron E, and which is arranged over the spiked husking-roll C. This roll I is provided with a shaft $i$, the end portions of which slide up and down in guide-slots $i'$ in the frame A.

J is an endless conveyer-carrier of flexible material. The rear end of this carrier passes over a roller K which is secured on a shaft $k$. The shaft $k$ is journaled in the frame A, and has a toothed wheel $k'$ secured on it, which gears into the toothed wheel $b'$. The carrier J is arranged at an angle with the horizontal, and a converging passage $j$ is formed between its upper bight and the front end portion of the lower bight of the apron E. The said bights are driven positively, at the same speed and in the same direction. The front end of the conveyer-carrier J passes over a roller L which is secured on a shaft $j'$. The shaft $j'$ is journaled in the lower ends of links M which are pivoted to the frame A by pins $m$. The frame A is provided with slots or openings which permit the shaft $j'$ to be moved by the links to adjust the tension of the carrier J, and $m'$ are clamping-screws for securing the said links to the frame in any desired position.

N is the upper end portion of a feed-elevator of any approved construction. This elevator is driven by a drum $n$ having a driving-shaft $n'$ which is journaled in the frame A. This shaft $n'$ is driven by a drive-chain O which passes over a sprocket-wheel $o$ secured on the shaft $n'$, and over a sprocket-wheel $o'$ secured on the shaft $k$.

R is a curved guard-plate secured to the frame A over the upper end of the elevator.

S is a finger pivoted to an arm $s$ which is secured to the frame A. The finger S projects over the elevator buckets or slats and arranges any ear of corn in position which may be projecting in an undesirable manner.

The ears of corn are fed into the elevator, and are carried up and are discharged one by one at periodic intervals into the larger end of the converging passage $j$. The ears of corn are grasped between the two opposed bights which form the said passage $j$, and they are pressed upon the spiked husking-roll C by the pressing-roll I. The husk is removed by the joint action of the rolls C and D and the lower bight of the apron E. The husks fall between the rolls C and D, and the husked ears slide down a chute T into a suitable receptacle. A cleaning-roll is secured on the shaft B and is of any approved construction. This cleaning-roll prevents the husks from adhering to the spiked husking-roll C. This cleaning-roll is not shown in the drawings as its use may be dispensed with, if desired, or any other approved cleaning device may be used in place of it.

What we claim is:

1. A husking-roll, comprising a body-portion, screwthreaded sockets screwed into the said body-portion and provided with bottom-plates, perforated guide-plates closing the outer ends of the said sockets, spikes which slide in the said guide-plates and which have heads arranged between the said guide-plates and bottom-plates, and springs for projecting the said spikes from the roll interposed between the said heads and bottom-plates.

2. A husking-roll, comprising a body portion, a series of disks of soft material encircling the said body portion and forming a continuous yielding surface at the periphery of the roll, washers of smaller diameter than the said disks arranged between them, and fastening-devices for clamping the said disks and washers on the said body portion.

3. A husking-roll, comprising a body portion, a series of disks of soft material encircling the said body portion and forming a continuous yielding surface at the periphery of the roll, washers of smaller diameter than the said disks arranged between them and splined to the said body portion, and means for compressing the said disks between the said washers thereby securing them to the said body portion.

4. In a corn-husker, the combination, with a husking-roll having a series of projections on its surface, of a husking-roll having a screwthreaded body portion, a series of disks of soft material encircling the said body portion, washers arranged between the said disks and splined to the said body portion, and nut-washers screwed to the said body portion and clamping the said disks and washers endwise.

5. In a corn-husker, the combination, with a pair of revoluble husking-rolls, of an endless conveyer carrier arranged at the front side of the said husking-rolls, an endless apron arranged over the said husking-rolls and carrier, a feed-passage being formed between the adjacent bights of the said carrier and apron, and a presser-roll engaging with the lower bight of the said apron and arranged above the said husking-rolls at the delivery end of the said feed-passage.

6. In a corn-husker, the combination, with a pair of husking-rolls, and means for driving the said rolls in opposite directions; of an endless conveyer carrier mounted in front of the said rolls, an endless apron arranged over the said rolls and carrier, a spring-pressed roller arranged at the rear end of the said apron and holding it under tension, and a presser-roll engaging with the middle part of the lower bight of the said apron and arranged over the foremost of the said rolls.

7. In a corn-husker, the combination, with a pair of revoluble husking-rolls, of an endless conveyer carrier arranged in a rearwardly and downwardly inclined position at the front side of the said husking-rolls, an endless apron arranged over the said husking-rolls and carrier, an inclined and converging feed-passage being formed between the adjacent bights of the said carrier and apron, means for driving the said bights at the same speed and in the same direction whereby the ears are seized and are traversed crosswise of the said husking-rolls, and a presser-roll engaging with the lower bight of the said apron and arranged above the said husking-rolls at the delivery end of the said feed-passage.

8. In a corn-husker, the combination, with a pair of husking-rolls, and means for driving the said rolls in opposite directions; of an endless conveyer carrier mounted in front of the said rolls, an endless apron mounted over the said rolls and carrier, an inclined converging passage being formed between the upper bight of the said carrier and the lower bight of the said apron, means for driving the said bights in the same direction, whereby the ears are seized and are traversed crosswise of the said rolls, and an elevator which feeds the ears of corn one by one into the larger end of the said converging passage.

In testimony whereof we affix our signatures, in presence of witnesses.

THOMAS H. BUTLER.
FRANCIS M. WIDERMAN.

Witnesses to the signature of T. H. Butler:
MARY M. MAGRAW,
WILBUR F. SMITH.

Witnesses to the signature of Francis M. Widerman:
JOHN A. SHIELDS,
BENJ. A. KELLOGG.